United States Patent
Huang

(10) Patent No.: US 10,795,418 B2
(45) Date of Patent: Oct. 6, 2020

(54) INPUT DEVICE AND NOTEBOOK COMPUTER

(71) Applicant: PEGATRON CORPORATION, Taipei (TW)

(72) Inventor: Hai-Wei Huang, Taipei (TW)

(73) Assignee: PEGATRON CORPORATION, Taipei (TW)

(*) Notice: Subject to any disclaimer, the term of this patent is extended or adjusted under 35 U.S.C. 154(b) by 0 days.

(21) Appl. No.: 16/707,771

(22) Filed: Dec. 9, 2019

(65) Prior Publication Data

US 2020/0225714 A1    Jul. 16, 2020

(30) Foreign Application Priority Data

Jan. 15, 2019    (TW) .............................. 108101444 A

(51) Int. Cl.
*G06F 3/0354* (2013.01)
*G06F 1/16* (2006.01)

(52) U.S. Cl.
CPC .......... *G06F 1/1692* (2013.01); *G06F 1/1624* (2013.01); *G06F 3/03547* (2013.01)

(58) Field of Classification Search
CPC .... G06F 3/00; G06F 3/03541; G06F 3/03543; G06F 3/03547
See application file for complete search history.

(56) References Cited

U.S. PATENT DOCUMENTS

| | | | | |
|---|---|---|---|---|
| 6,035,350 A | * | 3/2000 | Swamy | G06F 1/1616 710/51 |
| 8,072,423 B2 | | 12/2011 | Rolus Borgward | |
| 2001/0033267 A1 | * | 10/2001 | Kim | G06F 1/1656 345/156 |
| 2004/0145565 A1 | * | 7/2004 | Yang | G06F 1/169 345/163 |
| 2020/0117289 A1 | * | 4/2020 | Chiu | G06F 1/169 |

FOREIGN PATENT DOCUMENTS

| | | |
|---|---|---|
| CN | 102053726 | 5/2011 |
| CN | 206363197 | 7/2017 |
| TW | 563852 | 11/2003 |
| TW | M281228 | 11/2005 |
| TW | M408738 | 8/2011 |

* cited by examiner

*Primary Examiner* — Roy P Rabindranath
(74) *Attorney, Agent, or Firm* — J.C. Patents

(57) ABSTRACT

An input device includes a first body and a second body. When the first body is connected to the second body and the first body and the second body is disposed at a notebook computer, the first body and the second body are jointly used as a touchpad. When the first body is connected to the second body and both the first body and the second body are separated from the notebook computer, the first body and the second body are jointly used as a mouse. When the first body is separated from the second body and both the first body and the second body are separated from the notebook computer, the first body and the second body are respectively used as two independent remote controls. In addition, a notebook computer including the foregoing input device is also provided.

10 Claims, 5 Drawing Sheets

INPUT DEVICE AND NOTEBOOK COMPUTER

CROSS-REFERENCE TO RELATED APPLICATION

This non-provisional application claims priority under 35 U.S.C. § 119(a) to Patent Application No. 108101444 filed in Taiwan, R.O.C. on Jan. 15, 2019, the entire contents of which are hereby incorporated by reference.

BACKGROUND

Technical Field

The application relates to an input device and a notebook computer, and in particular, to an input device that may be separated from a notebook computer and a notebook computer.

Related Art

With the development of science and technology, portable electronic devices such as a notebook computer or a tablet computer are common in daily life. However, if a user intends to draw, play a video game, or perform other operations that cannot be easily completed using only a touchpad on a notebook computer, the user needs to install an input device such as a mouse or a joystick, etc., so that the user can operate the notebook computer using the foregoing interfaces.

However, carrying an additional mouse or joystick brings burden to a user and is very inconvenient. Therefore, how to meet a convenience requirement while improving operability and entertainment of a portable electronic device is an important issue in development of the field.

SUMMARY

The application provides an input device separably disposed at a notebook computer. The input device has different use modes and can provide relatively good convenience.

The application provides a notebook computer having the foregoing input device.

The input device of the application is separably disposed at a notebook computer, the notebook computer including a processor and a computer wireless module electrically connected to the processor, and the input device including a first body and a second body. The first body includes a first touch module, a first wireless module, a first electrical connecting portion, and a third electrical connecting portion. The second body is separably connected to the first body, the second body including a second touch module, a second wireless module, a second electrical connecting portion, and a fourth electrical connecting portion, where the first wireless module, the second wireless module, and the computer wireless module are connected to each other through signals. When the first electrical connecting portion of the first body is electrically connected to the second electrical connecting portion of the second body, and the third electrical connecting portion of the first body and the fourth electrical connecting portion of the second body are electrically connected to the notebook computer, the processor of the notebook computer determines that the first body and the second body are jointly used as a touchpad of the notebook computer, and then the first touch module and the second touch module are triggered to be jointly displayed as a first use interface. When the first electrical connecting portion of the first body is electrically connected to the second electrical connecting portion of the second body, and both the first body and the second body are separated from the notebook computer, the third electrical connecting portion and the fourth electrical connecting portion are not electrically connected to the notebook computer, and the processor of the notebook computer determines that the first body and the second body are jointly used as a mouse, and then the first touch module and the second touch module are triggered to be jointly displayed as a second use interface. When the first body is separated from the second body and both the first body and the second body are separated from the notebook computer, the first electrical connecting portion is not electrically connected to the second electrical connecting portion, and the third electrical connecting portion and the fourth electrical connecting portion are not electrically connected to the notebook computer, and the processor of the notebook computer determines that the first body and the second body are used as two independent remote controls, and then the first touch module is triggered to be displayed as a third use interface, and the second touch module is triggered to be displayed as a fourth use interface.

In an embodiment of the application, the foregoing first body further includes a first connecting structure disposed on a first side of the first body, and the second body further includes a second connecting structure disposed on a second side of the second body, the first connecting structure of the first body being detachably fixed to the second connecting structure of the second body.

In an embodiment of the application, the foregoing first body further includes a third connecting structure disposed on a third side adjacent to the first side, and the second body further includes a fourth connecting structure disposed on a fourth side adjacent to the second side, the first body and the second body being detachably fixed to the notebook computer using the third connecting structure and the fourth connecting structure.

In an embodiment of the application, the foregoing first electrical connecting portion, the second electrical connecting portion, the third electrical connecting portion, and the fourth electrical connecting portion are respectively located at the first connecting structure, the second connecting structure, the third connecting structure, and the fourth connecting structure.

In an embodiment of the application, the foregoing first connecting structure and the second connecting structure are two corresponding clamping hooks or two magnetic members that attract each other.

In an embodiment of the application, the foregoing third connecting structure and the fourth connecting structure are two clamping hooks or two magnetic members.

In an embodiment of the application, the foregoing first connecting structure and the third connecting structure are retractably configured on the first body, and the second connecting structure and the fourth connecting structure are retractably configured on the second body.

In an embodiment of the application, the foregoing first touch module is a first touch screen, and the second touch module is a second touch screen.

In an embodiment of the application, the foregoing first body further includes a first power supply electrically connected to the first touch module, and the second body further includes a second power supply electrically connected to the second touch module.

The application provides a notebook computer, including a lower body, an upper body, and any of the foregoing input devicees. The lower body has a recess. The upper body is pivotally connected to the lower body. The input device is separably configured at the recess.

Based on the foregoing descriptions, the input device of the application is suitable for being disposed at the notebook computer as a touchpad of the notebook computer. When the input device is separated from the notebook computer, the input device can be used as a mouse. When the input device is separated from the notebook computer and the first body and the second body of the input device are separated from each other, the first body and the second body are respectively used as an independent remote control. In other words, the input device of the application has different use modes in different connecting states. In this way, the input device of the application can greatly improve convenience and entertainment for a user to operate the notebook computer. In addition, because the user does not need to carry an additional apparatus, burden on the user can be greatly reduced.

In order to make the aforementioned features and advantages of the application more comprehensible, embodiments are further described in detail hereinafter with reference to accompanying drawings.

DETAILED DESCRIPTION OF THE EMBODIMENTS

Figure 1:
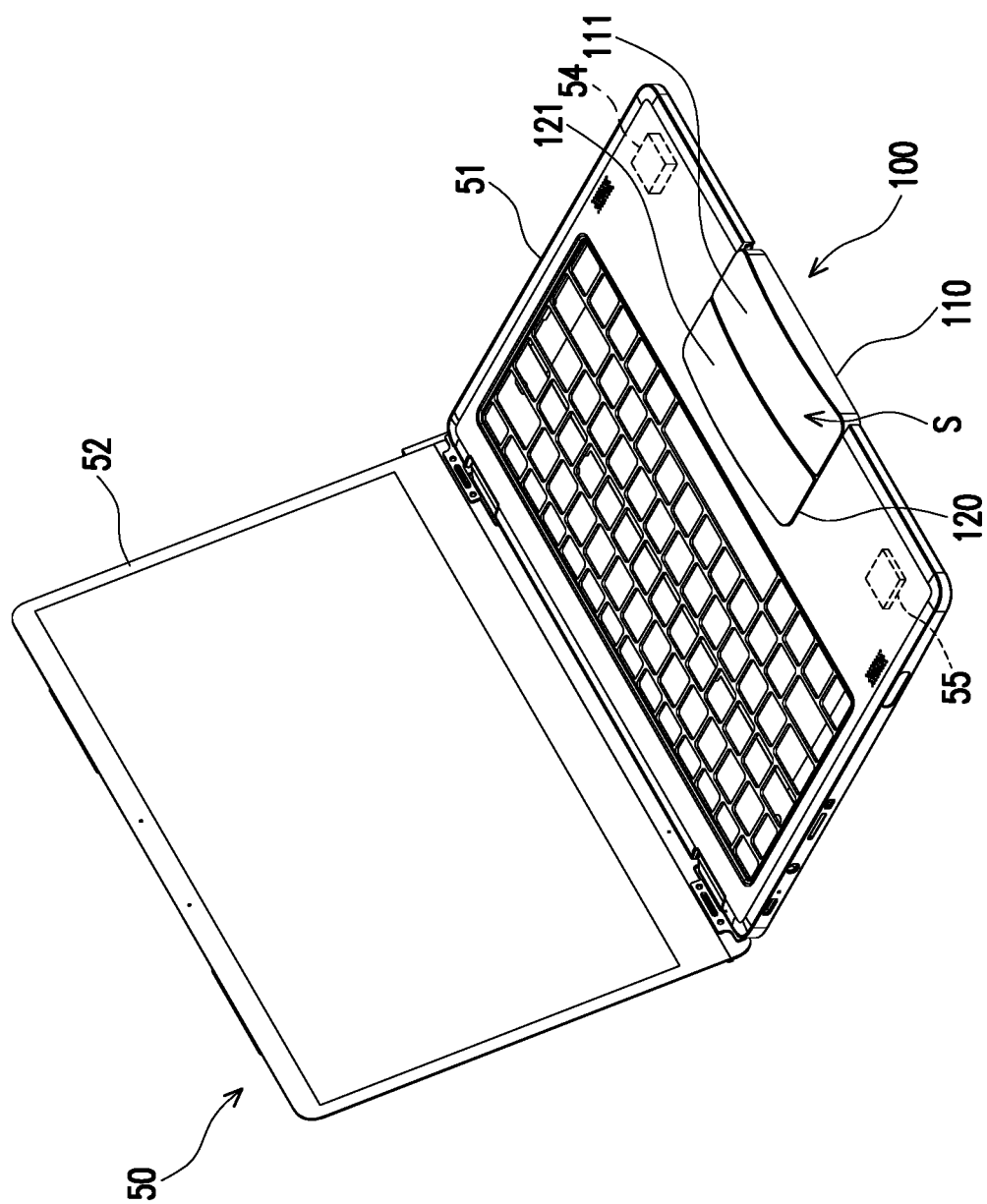
FIG. 1 is a three-dimensional schematic view of a notebook computer having an input device according to an embodiment of the application.
Figure 2:
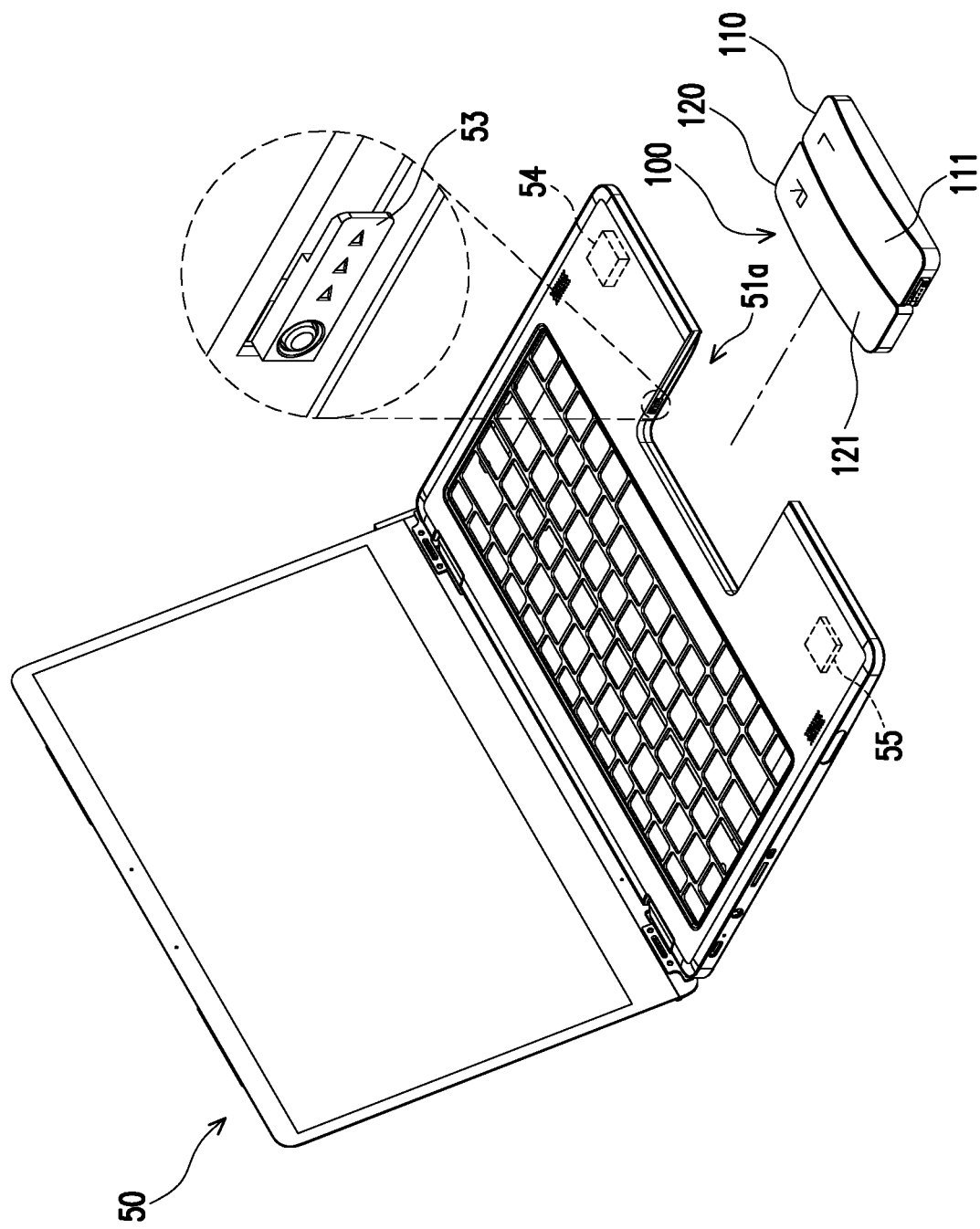
FIG. 2 is a three-dimensional schematic view in which an input device in FIG. 1 is separated from a notebook computer.

FIG. 1 is a three-dimensional schematic view of a notebook computer having an input device according to an embodiment of the application. FIG. 2 is a three-dimensional schematic view in which an input device in FIG. 1 is separated from a notebook computer. Referring to FIG. 1 and FIG. 2, the input device 100 is separably disposed at the notebook computer 50. The input device 100 includes a first body 110 and a second body 120. The first body 110 includes a first touch module 111. The second body 120 includes a second touch module 121. The first body 110 is separably connected to the second body 120, and the first body 110 and the second body 120 are disposed at the notebook computer 50. The notebook computer 50 includes a processor 55, a computer wireless module 54, a lower body 51, and an upper body 52. The computer wireless module 54 is electrically connected to the processor 55. The processor 55 and the computer wireless module 54 are located within the lower body 51, the lower body 51 having a recess 51a. The upper body 52 is pivotally connected to the lower body 51. The input device 100 is separably configured at the recess 51a. In this embodiment, a surface S of the input device 100 is arc-shaped, but in other embodiments, the surface S of the input device 100 may also be a plane, which is not limited thereto.

Figure 3:
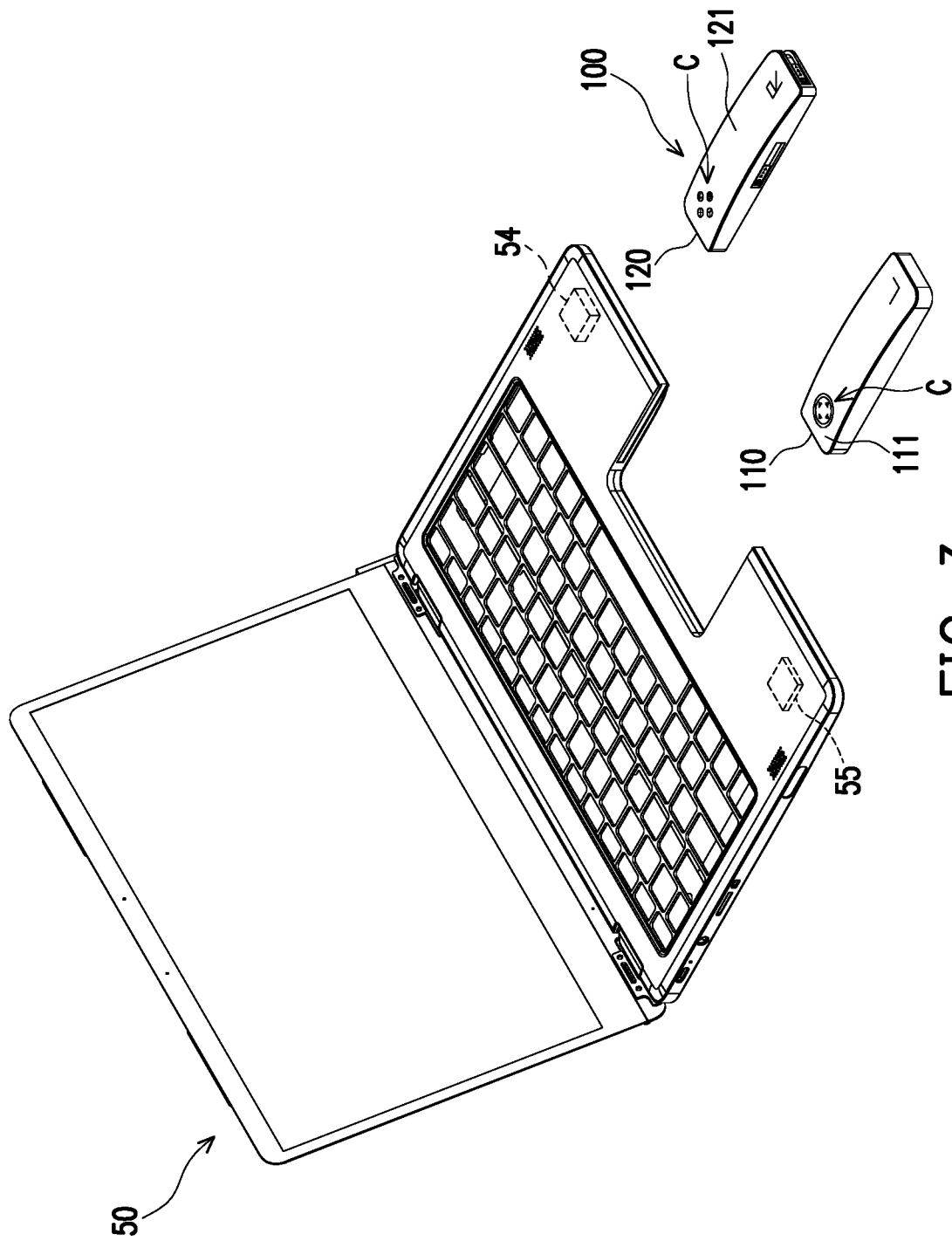
FIG. 3 is a three-dimensional schematic view in which a first body is separated from a second body in FIG. 2.
Figure 4:
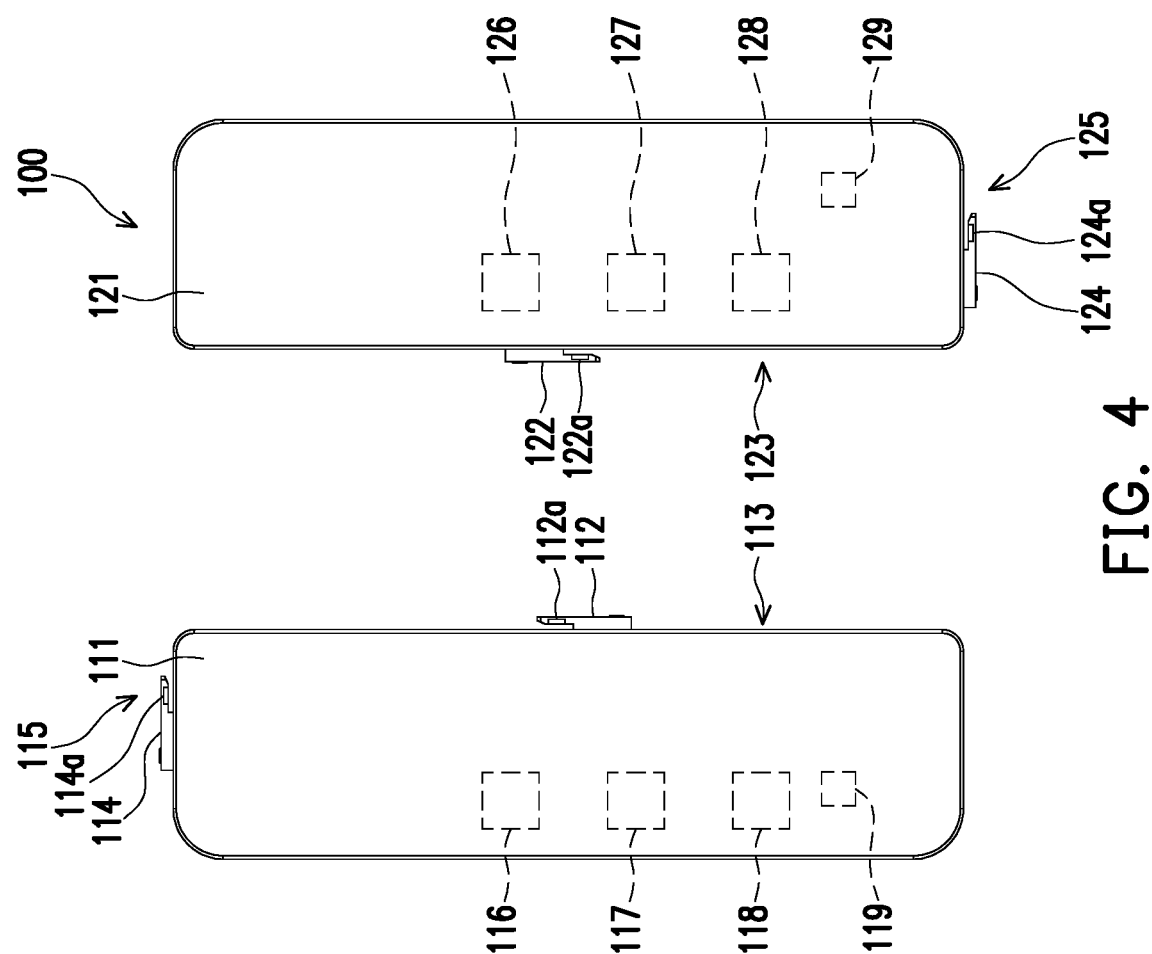
FIG. 4 is a schematic front view of a first body and a second body.

FIG. 3 is a three-dimensional schematic view in which a first body is separated from a second body in FIG. 2. FIG. 4 is a schematic front view of a first body and a second body. In this embodiment, the first body 110 further includes a first electrical connecting portion 112a, a first wireless module 118, and a third electrical connecting portion 114a. The second body 120 includes a second electrical connecting portion 122a, a second wireless module 128, and a fourth electrical connecting portion 124a. The first wireless module 118, the second wireless module 128, and the computer wireless module 54 are connected to each other through signals.

As shown in FIG. 1 to FIG. 4, in this embodiment, when the first electrical connecting portion 112a of the first body 110 is electrically connected to the second electrical connecting portion 122a of the second body 120, and the third electrical connecting portion 114a of the first body 110 and the fourth electrical connecting portion 124a of the second body 120 are electrically connected to the notebook computer 50, the processor 55 of the notebook computer 50 determines that the first body 110 and the second body 120 are jointly used as a touchpad of the notebook computer 50, and then the first touch module 111 and the second touch module 121 are triggered to be jointly displayed as a first use interface.

As shown in FIG. 2 to FIG. 4, in this embodiment, when the first electrical connecting portion 112a of the first body 110 is electrically connected to the second electrical connecting portion 122a of the second body 120, and both the first body 110 and the second body 120 are separated from the notebook computer 50, the third electrical connecting portion 114a and the fourth electrical connecting portion 124a are not electrically connected to the notebook computer 50, and the processor 55 of the notebook computer 50 determines that the first body 110 and the second body 120 are jointly used as a mouse, and then the first touch module 111 and the second touch module 121 are triggered to be jointly displayed as a second use interface. In this way, when a user intends to operate the notebook computer 50 using a mouse, the user does not need to carry accessories such as an additional mouse, and the user only needs to separate the input device 100 from the notebook computer 50, so that the input device 100 can be used as a mouse.

As shown in FIG. 3 to FIG. 4, in this embodiment, when the first body 110 is separated from the second body 120 and both the first body 110 and the second body 120 are separated from the notebook computer 50, the first electrical connecting portion 112a is not electrically connected to the second electrical connecting portion 122a, the third electrical connecting portion 114a and the fourth electrical connecting portion 124a are not electrically connected to the notebook computer 50, and the processor 55 of the notebook computer 50 determines that the first body 110 and the second body 120 are respectively used as an independent remote control, and then the first touch module 111 is triggered to be displayed as a third use interface, and the second touch module 121 is triggered to be displayed as a fourth use interface. In this way, a user does not need to carry additional accessories such as a joystick, a connector, etc. When the user intends to play a video game, the user only needs to separate the input device 100 from the notebook computer 50, and then separate the first body 110 from the second body 120, so that two remote controls (the first body 110 and the second body 120) can be used to play a video game on the notebook computer 50.

The input device 100 is described in more detail below. Referring to FIG. 4, in this embodiment, the first body 110 further includes a first connecting structure 112 and a third connecting structure 114. The first connecting structure 112 is disposed on a first side 113 of the first body 110, and the third connecting structure 114 is disposed on a third side 115 adjacent to the first side 113. The second body 120 further includes a second connecting structure 122 and a fourth connecting structure 124. The second connecting structure 122 is disposed on a second side 123 of the second body 120, and the fourth connecting structure 124 is disposed on a fourth side 125 adjacent to the second side 123.

In this embodiment, the first connecting structure 112 of the first body 110 is detachably fixed to the second connecting structure 122 of the second body 120. In this embodiment, the first connecting structure 112 and the second connecting structure 122 are two corresponding clamping hooks that may be fixed with each other through clamping. The third connecting structure 114 of the first body 110 and the fourth connecting structure 124 of the second body 120 are detachably fixed to the notebook computer 50. In this embodiment, the third connecting structure 114 and the fourth connecting structure 124 are two clamping hooks that may be fixed to the notebook computer 50. Definitely, in other embodiments, the first connecting structure 112 and the second connecting structure 122 may also be two magnetic members that attract each other, and the third connecting structure 114 and the fourth connecting structure 124 may also be two magnetic members. The application is not limited thereto.

In this embodiment, the first body 110 and the second body 120 are detachably fixed to the notebook computer 50 using the third connecting structure 114 and the fourth connecting structure 124. In fact, the notebook computer 50 has two fixing structures 53 (which are shown in FIG. 2, one of the fixing structures 53 being blocked) respectively corresponding to the third connecting structure 114 and the fourth connecting structure 124, and two electrical connecting portions (not depicted) that are respectively located at the two fixing structures 53 and that correspond to the third electrical connecting portion 114a and the fourth electrical connecting portion 124a.

In this way, the first body 110 and the second body 120 are fixed to the notebook computer 50 using the third connecting structure 114 and the fourth connecting structure 124, and are electrically connected to the notebook computer 50 using the third electrical connecting portion 114a located on the third connecting structure 114 and the fourth electrical connecting portion 124a located on the fourth connecting structure 124. In addition, the input device 100 may be electrically connected to the notebook computer 50 using the third electrical connecting portion 114a and the fourth electrical connecting portion 124a, to charge the first body 110 and the second body 120.

In this embodiment, the two fixing structures 53 of the notebook computer 50 are two clamping hooks. However, in other embodiments, the two fixing structures 53 may also be two magnetic members. As long as the two fixing structures 53 can be respectively fixed to the third connecting structure 114 and the fourth connecting structure 124, and the two fixing structures 53 can be respectively connected to the third connecting structure 114 and the fourth connecting structure 124, the two fixing structures shall fall within the scope of the application.

In addition, in this embodiment, the first touch module 111 is a first touch screen, and the second touch module 121 is a second touch screen. The first touch screen and the second touch screen are suitable for displaying a text message and a video. However, in other embodiments, the first touch module 111 and the second touch module 121 may also respectively include a light source module, such as a light emitting diode (LED), to display the text message and the video. A way of displaying the text message and the video is not limited thereto.

As shown in FIG. 1, when the first body 110 and the second body 120 are jointly used as a touchpad of the notebook computer 50, the first touch screen and the second touch screen are triggered to be jointly displayed as a first use interface, that is, jointly displayed as one touchpad interface within scope of the first touch screen and the second touch screen.

As shown in FIG. 2, when the first body 110 and the second body 120 are jointly used as a mouse, the first touch screen and the second touch screen are triggered to be jointly displayed as a second use interface. The first touch screen can display an English letter (for example, L) to represent a left mouse button, and the second touch screen can display an English letter (for example, R) to represent a right mouse button, so that the user can operate the mouse conveniently. Definitely, a displaying way is not limited thereto, and any displaying way in which a user can clearly determine the left and right buttons of the mouse shall fall within the to-be-protected scope of the field.

As shown in FIG. 3, when the first body 110 and the second body 120 are respectively used as an independent remote control, the first touch screen is triggered to be displayed as a third use interface, and the second touch screen is triggered to be displayed as a fourth use interface. The first touch screen and the second touch screen can display a pattern, a character, or a combination thereof, and various patterns, characters, or a combination thereof may represent a plurality of different functional keys C, so that the user can operate with two remote controls. In this embodiment, a configuration of the functional key C is shown in FIG. 3. However, in other embodiments, the functional key C may also be configured according to a use requirement, which is not limited thereto.

As shown in FIG. 4, in this embodiment, the first body 110 further includes a first controller 116 and a first vibrator 117, the first controller 116 and the first vibrator 117 being electrically connected to each other. The second body 120 further includes a second controller 126 and a second vibrator 127, the second controller 126 and the second vibrator 127 being electrically connected to each other. For example, when a user is attacked or obtains a score in a game, the first vibrator 117 and the second vibrator 127 can cause the first body 110 or the second body 120 to vibrate, so that the user can achieve better game experience.

In addition, when the first touch module 111 is touched by at least one object (for example, a user's finger), the first controller 116 receives a touch signal generated from the first touch module 111. The touch signal triggers the first vibrator 117 to vibrate and feed the vibration back to the finger. When the second touch module 121 is touched by a finger, the second controller 126 receives a touch signal from the second touch module 121. The control signal triggers the second vibrator 127 to vibrate and feed the vibration back to the finger, so that the user achieves better touch experience.

In this embodiment, the first body 110 further includes a first wireless module 118 electrically connected to the first controller 116, and the second body 120 further includes a second wireless module 128 electrically connected to the second controller 126. In other words, the first body 110, the second body 120, and the notebook computer 50 may also transmit signals to each other using the first wireless module 118, the second wireless module 128, and the computer wireless module 54, to smoothly switch different functions (a touchpad, a mouse, and a remote control) and modes of the input device 100.

In other words, in an embodiment, the first body 110 and the second body 120 may also omit the first electrical connecting portion 112a and the second electrical connecting portion 122a, and transmit signals using the first wireless module 118 and the second wireless module 128.

In this embodiment, the first body 110 further includes a first power supply 119 electrically connected to the first controller 116, the first power supply 119 being electrically connected to the first touch module 111, and the second body 120 further includes a second power supply 129 electrically connected to the second controller 126, the second power supply 129 being electrically connected to the second touch module 121. Herein, the first power supply 119 and the second power supply 129 are, for example, batteries, to supply power to the first body 110 and the second body 120.

Figure 5:
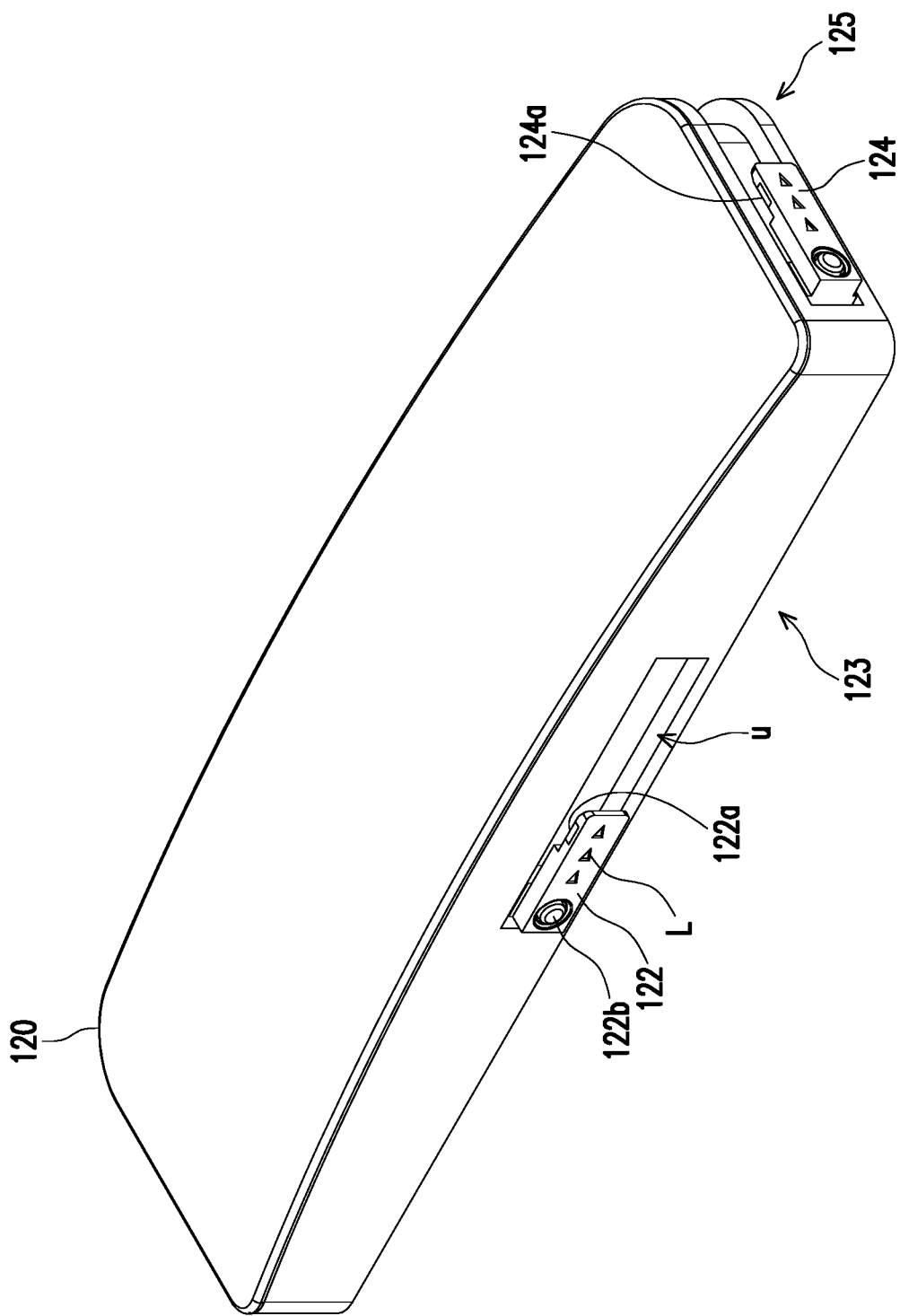
FIG. 5 is a three-dimensional schematic view of a second body.

In addition, in this embodiment, the first connecting structure 112 and the third connecting structure 114 are retractably configured on the first body 110, and the second connecting structure 122 and the fourth connecting structure 124 are retractably configured on the second body 120. FIG. 5 is a three-dimensional schematic view of a second body, and the second connecting structure 122 and the fourth connecting structure 124 of the second body 120 are used for description herein. Referring to FIG. 5, in particular, the second side 123 of the second body 120 has a groove u, and the second connecting structure 122 includes a button 122b, and a user may press the button 122b. In addition, using a push-push structure between the second connecting structure 122 and the second body 120, the second connecting structure 122 is retractably configured within the groove u of the second body 120.

Similarly, the fourth connecting structure 124 is also retractably configured on the second body 120 using the push-push structure. The first connecting structure 112 and the third connecting structure 114 are also retractably configured on the first body 110 in a manner similar to the foregoing manner, and details are not described herein again. In another embodiment, the button 122b can also serve as other functional keys of the input device 100, and is not limited to the above functions.

In this embodiment, light sources L are disposed at all of the first connecting structure 112, the third connecting structure 114, the second connecting structure 122, and the fourth connecting structure 124. As shown in FIG. 5, the light sources L at the second connecting structure 122 present arrow symbols toward a same direction. Herein, a function of the light sources L is as follows: when the second connecting structure 122 is connected to the first connecting structure 112, the light sources L are suitable for indicating, for a user, a connecting direction between the second connecting structure 122 and the first connecting structure 112. Light sources L on the fourth connecting structure 124 are suitable for indicating, for a user, a connecting direction between the fourth connecting structure 124 and a fixing structure 53 of the notebook computer 50. Definitely, in other embodiments, the light sources L may be omitted, and a connecting direction may be represented through printing or engraving, etc.

In summary, the input device of the application is suitable for being disposed at the notebook computer as a touchpad of the notebook computer. When the input device is separated from the notebook computer, the input device can be used as a mouse. When the input device is separated from the notebook computer and the first body and the second body of the input device are separated from each other, the first body and the second body are respectively used as an independent remote control. In other words, the input device of the application has different functions in different connecting states. In this way, the input device of the application can greatly improve convenience and entertainment for a user to operate the notebook computer. In addition, because the user does not need to carry an additional apparatus, burden on the user can be greatly reduced.

Although the application has been described with reference to the above embodiments, the embodiments are not intended to limit the application. Any person skilled in the art may make variations and improvements without departing from the spirit and scope of the application. Therefore, the protection scope of the application should be subject to the appended claims.

What is claimed is:

1. An input device separably disposed at a notebook computer, the notebook computer comprises a processor and a computer wireless module electrically connected to the processor, and the input device comprising:
    a first body, comprising a first touch module, a first wireless module, a first electrical connecting portion, and a third electrical connecting portion; and
    a second body separably connected to the first body, the second body comprising a second touch module, a second wireless module, a second electrical connecting portion, and a fourth electrical connecting portion, wherein the first wireless module, the second wireless module, and the computer wireless module are connected to each other through signals, and
    when the first electrical connecting portion of the first body is electrically connected to the second electrical connecting portion of the second body, and the third electrical connecting portion of the first body and the fourth electrical connecting portion of the second body are electrically connected to the notebook computer, the processor of the notebook computer determining that the first body and the second body are jointly used as a touchpad of the notebook computer, and then the first touch module and the second touch module being triggered to be jointly displayed as a first use interface,
    when the first electrical connecting portion of the first body is electrically connected to the second electrical connecting portion of the second body, and both the first body and the second body are separated from the notebook computer, the third electrical connecting portion and the fourth electrical connecting portion being not electrically connected to the notebook computer, and the processor of the notebook computer determining that the first body and the second body are jointly used as a mouse, and then the first touch module and the second touch module being triggered to be jointly displayed as a second use interface, or
    when the first body is separated from the second body and both the first body and the second body are separated from the notebook computer, the first electrical connecting portion being not electrically connected to the second electrical connecting portion, and the third electrical connecting portion and the fourth electrical connecting portion being not electrically connected to the notebook computer, and the processor of the notebook computer determining that the first body and the second body are used as two independent remote controls, and then the first touch module being triggered to be displayed as a third use interface, and the second touch module being triggered to be displayed as a fourth use interface.

2. The input device according to claim 1, wherein the first body further comprises a first connecting structure disposed on a first side of the first body, and the second body further comprises a second connecting structure disposed on a second side of the second body, the first connecting structure of the first body being detachably fixed to the second connecting structure of the second body.

3. The input device according to claim 2, wherein the first body further comprises a third connecting structure disposed on a third side adjacent to the first side, and the second body further comprises a fourth connecting structure disposed on a fourth side adjacent to the second side, the first body and the second body being detachably fixed to the notebook computer using the third connecting structure and the fourth connecting structure.

4. The input device according to claim 3, wherein the first electrical connecting portion, the second electrical connecting portion, the third electrical portion, and the fourth electrical connecting portion are respectively located at the first connecting structure, the second connecting structure, the third connecting structure, and the fourth connecting structure.

5. The input device according to claim 2, wherein the first connecting structure and the second connecting structure are two corresponding clamping hooks or two magnetic members that attract each other.

6. The input device according to claim 3, wherein the third connecting structure and the fourth connecting structure are two clamping hooks or two magnetic members.

7. The input device according to claim 3, wherein the first connecting structure and the third connecting structure are retractably configured on the first body, and the second connecting structure and the fourth connecting structure are retractably configured on the second body.

8. The input device according to claim 1, wherein the first touch module is a first touch screen, and the second touch module is a second touch screen.

9. The input device according to claim 1, wherein the first body further comprises a first power supply electrically connected to the first touch module, and the second body further comprises a second power supply electrically connected to the second touch module.

10. A notebook computer, comprising:
a lower body having a recess;
an upper body pivotally connected to the lower body;
a processor;
a computer wireless module electrically connected to the processor; and
an input device separably configured at the recess, and the input device comprising:
a first body, comprising a first touch module, a first wireless module, a first electrical connecting portion, and a third electrical connecting portion; and
a second body separably connected to the first body, the second body comprising a second touch module, a second wireless module, a second electrical connecting portion, and a fourth electrical connecting portion, wherein the first wireless module, the second wireless module, and the computer wireless module are connected to each other through signals, and
when the first electrical connecting portion of the first body is electrically connected to the second electrical connecting portion of the second body, and the third electrical connecting portion of the first body and the fourth electrical connecting portion of the second body are electrically connected to the notebook computer, the processor of the notebook computer determining that the first body and the second body are jointly used as a touchpad of the notebook computer, and then the first touch module and the second touch module being triggered to be jointly displayed as a first use interface,
when the first electrical connecting portion of the first body is electrically connected to the second electrical connecting portion of the second body, and both the first body and the second body are separated from the notebook computer, the third electrical connecting portion and the fourth electrical connecting portion being not electrically connected to the notebook computer, and the processor of the notebook computer determining that the first body and the second body are jointly used as a mouse, and then the first touch module and the second touch module being triggered to be jointly displayed as a second use interface, or
when the first body is separated from the second body and both the first body and the second body are separated from the notebook computer, the first electrical connecting portion being not electrically connected to the second electrical connecting portion, and the third electrical connecting portion and the fourth electrical connecting portion being not electrically connected to the notebook computer, and the processor of the notebook computer determining that the first body and the second body are used as two independent remote controls, and then the first touch module being triggered to be displayed as a third use interface, and the second touch module being triggered to be displayed as a fourth use interface.

* * * * *